US009049634B2

(12) United States Patent
Hsu

(10) Patent No.: US 9,049,634 B2
(45) Date of Patent: Jun. 2, 2015

(54) APPARATUSES AND METHODS FOR CAMPING BACK TO LTE-BASED NETWORK AFTER FINISHING CSFB CALL WITH NON-LTE NETWORK

(71) Applicant: Acer Incorporated, Hsichih, New Taipei (TW)

(72) Inventor: Chu-Hsiang Hsu, New Taipei (TW)

(73) Assignee: ACER INCORPORATED, New Taipei (TW)

(*) Notice: Subject to any disclaimer, the term of this patent is extended or adjusted under 35 U.S.C. 154(b) by 111 days.

(21) Appl. No.: 13/839,612

(22) Filed: Mar. 15, 2013

(65) Prior Publication Data
US 2014/0079021 A1 Mar. 20, 2014

Related U.S. Application Data

(60) Provisional application No. 61/702,343, filed on Sep. 18, 2012.

(51) Int. Cl.
H04W 36/14 (2009.01)
H04W 36/00 (2009.01)
H04W 76/06 (2009.01)

(52) U.S. Cl.
CPC .......... H04W 36/14 (2013.01); H04W 36/0022 (2013.01); H04W 76/06 (2013.01)

(58) Field of Classification Search
None
See application file for complete search history.

(56) References Cited

U.S. PATENT DOCUMENTS

| 7,231,213 | B2* | 6/2007 | Dorsey et al. ................. 455/445 |
| 8,655,364 | B2 | 2/2014 | Kitani et al. |
| 2013/0070728 | A1* | 3/2013 | Umatt et al. ................... 370/331 |
| 2013/0189987 | A1* | 7/2013 | Klingenbrunn et al. ...... 455/436 |

FOREIGN PATENT DOCUMENTS

| EP | 2 437 543 | 4/2012 |
| WO | WO 2011/073884 | 6/2011 |
| WO | WO 2012/108820 | 8/2012 |

OTHER PUBLICATIONS

European Search Report dated Mar. 19, 2014.
English language translation of abstract of JP 2011-176641 (published Sep. 8, 2011).

* cited by examiner

Primary Examiner — Charles C Jiang
Assistant Examiner — George Atkins, Jr.
(74) Attorney, Agent, or Firm — McClure, Qualey & Rodack, LLP

(57) ABSTRACT

A mobile communication device is provided with a wireless module and a controller module. The wireless module performs wireless transmissions and receptions to and from a Long Term Evolution (LTE)-based network and a non-LTE network. The controller module blocks any outgoing Circuit-Switched (CS) service in response to finishing a CS Fallback (CSFB) call and having an ongoing Packet-Switched (PS) session with the non-LTE network, and performs an idle mode cell reselection procedure via the wireless module to camp back to the LTE-based network in response to the outgoing CS service having been blocked. Also, the controller module unblocks the outgoing CS service in response to camping back to the LTE-based network.

14 Claims, 4 Drawing Sheets

APPARATUSES AND METHODS FOR CAMPING BACK TO LTE-BASED NETWORK AFTER FINISHING CSFB CALL WITH NON-LTE NETWORK

CROSS REFERENCE TO RELATED APPLICATIONS

This application claims priority of U.S. Provisional Application No. 61/702,343, filed on Sep. 18, 2012, and the entirety of which is incorporated by reference herein.

BACKGROUND OF THE INVENTION

1. Field of the Invention

The invention generally relates to the operation of a User Equipment (UE) after it finishes a Circuit-Switched Fallback (CSFB) call, and more particularly, to apparatuses and methods for assisting a UE to camp back to a Long Term Evolution (LTE)-based network after finishing a CSFB call with a non-LTE network.

2. Description of the Related Art

With growing demand for ubiquitous computing and networking, various wireless technologies have been developed, such as the Wireless Local Area Network (WLAN) technologies, including the Wireless Fidelity (WiFi) technology, Bluetooth technology, and the Zigbee technology, etc., and also, the cellular technologies, including the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA2000) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and LTE-Advanced technology, etc.

For user convenience and flexibility, most User Equipments (UEs) (or may be referred to as Mobile Stations (MSs)) nowadays support more than one wireless technology. Taking a UE supporting both of the WCDMA technology and the LTE technology for example, it may selectively obtain wireless services using the WCDMA technology or the LTE technology. Generally, it selects an LTE network over a Universal Mobile Telecommunications System (UMTS) network when wireless services are available from both of the service networks, since the LTE network may more likely provide wireless services with higher bandwidth than the UMTS network. Nonetheless, in some cases, a technique called Circuit-Switched Fallback (CSFB) may be employed for a UE which is already camped on an LTE network to switch to the UMTS network for accessing, particularly, Circuit-Switched (CS) services, e.g., a CS call, instead. The CS call made utilizing the CSFB technique is generally referred to as a CSFB call.

According to the 3GPP TS 25.331 specification, v10.2.0, if there exists an ongoing Packet-Switched (PS) session between the UE and the UMTS network after finishing the CSFB call, the UE may camp back to the LTE network only when receiving a specific message from the UMTS network, such as a Radio Resource Control (RRC) Connection Release message, or a Handover from UTRAN message. However, the UMTS network may not deploy the specific message, possibly because the operator of the UMTS network may want to keep the UE in the UMTS network. As a result, the UE may stay in the UMTS network and not be able to camp back to the LTE network to obtain, preferred, faster wireless services.

BRIEF SUMMARY OF THE INVENTION

In order to solve the aforementioned problem, the invention proposes apparatuses and methods for assisting the UE to camp back to the LTE-based network from the non-LTE network after finishing a CSFB call while having an ongoing PS session.

In one aspect of the invention, a mobile communication device is provided. The mobile communication device comprises a wireless module and a controller module. The wireless module performs wireless transmissions and receptions to and from an LTE-based network and a non-LTE network. The controller module blocks any outgoing CS service in response to finishing a CSFB call and having an ongoing PS session with the non-LTE network, and performs an idle mode cell reselection procedure via the wireless module to camp back to the LTE-based network in response to the outgoing CS service having been blocked. Also, the controller module unblocks the outgoing CS service in response to camping back to the LTE-based network.

In another aspect of the invention, a method for a mobile communication device to camp back to an LTE-based network after finishing a CSFB call with a non-LTE network is provided. The method comprises the steps of blocking any outgoing CS service in response to finishing the CSFB call and having an ongoing Packet-Switched (PS) session with the non-LTE network, performing an idle mode cell reselection procedure to camp back to the LTE-based network in response to the outgoing CS service having been blocked, and unblocking the outgoing CS service in response to camping back to the LTE-based network.

Other aspects and features of the present invention will become apparent to those with ordinarily skill in the art upon review of the following descriptions of specific embodiments of the mobile communication devices and the methods for camping back to an LTE-based network after finishing a CSFB call with a non-LTE network.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
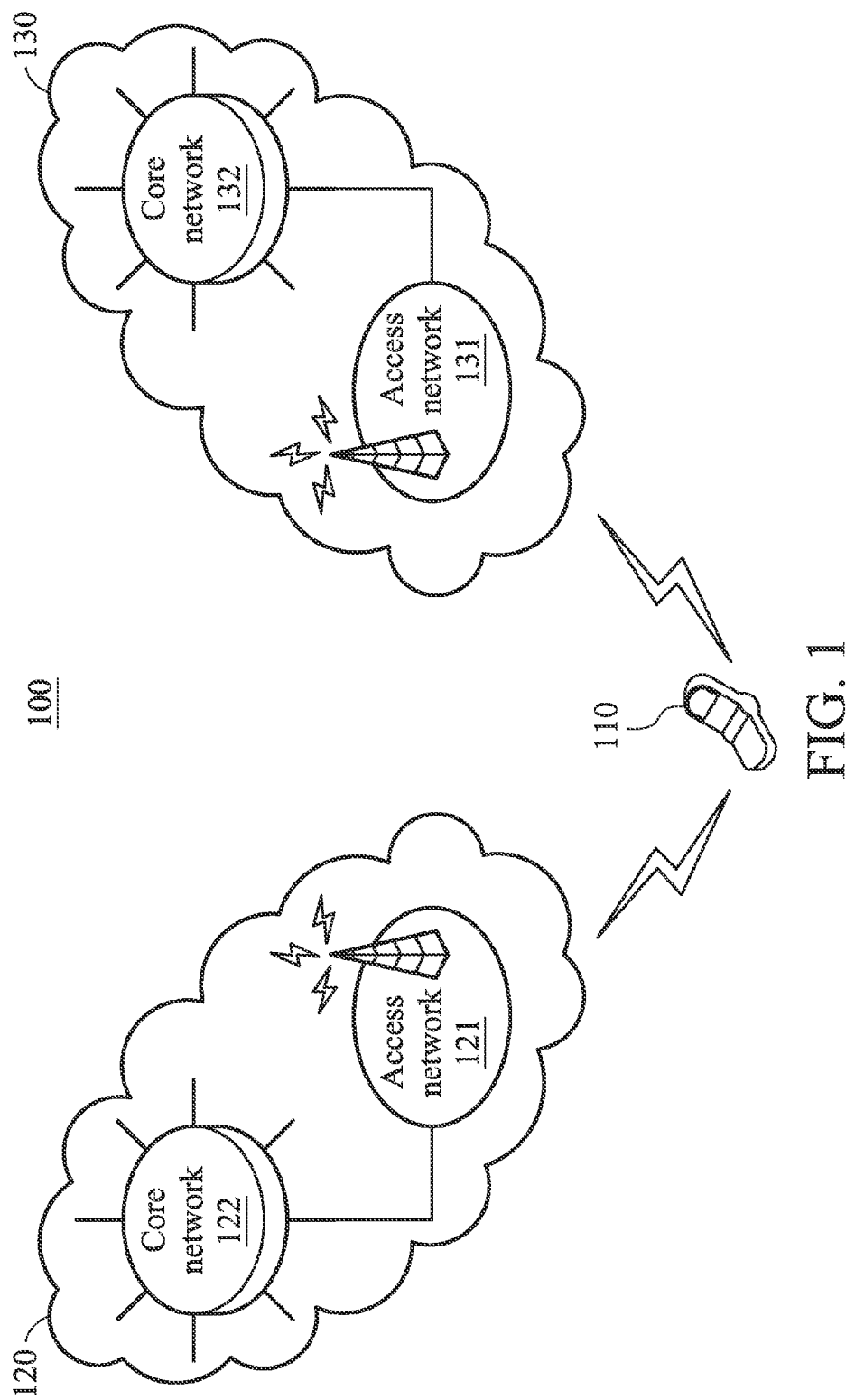
FIG. 1 is a block diagram of a wireless communications environment according to an embodiment of the invention.

FIG. 1 is a block diagram of a wireless communications environment according to an embodiment of the invention. The wireless communications environment 100 comprises a mobile communication device 110, an LTE-based network 120, and a non-LTE network 130, wherein the LTE-based network 120 provides wireless services only in the PS domain while the non-LTE network 130 provides wireless services in both of the CS and PS domains. Particularly, the LTE-based network 120 and the non-LTE network 130 support a specific procedure concerning the CSFB technique, to assist the mobile communication device 110 to switch from the LTE-based network 120 to the non-LTE network 130 for access CS services, e.g., a CSFB call.

The LTE-based network 120 may be an LTE network, a TD-LTE network, an LTE-Advanced network, or a service network utilizing any future evolutionary technology of the LTE technology family. The non-LTE network 130 may be a Universal Mobile Telecommunications System (UMTS) network, a CDMA2000 network, or any service network utilizing an evolutionary technology of the WCDMA or CDMA2000 technology family, such as the High Speed Downlink Packet Access (HSPDA) technology, High Speed Packet Access (HSPA) technology, CDMA2000 1x technology, CDMA2000 1x Evolution-Data Optimized (EV-DO) technology, etc., or other third generation cellular networks, such as a TD-SCDMA network.

Specifically, the LTE-based network 120 comprises an access network 121 and a core network 122, and the non-LTE network 130 comprises an access network 131 and a core network 132, wherein the access networks 121 and 131 are controlled by the core networks 122 and 132 to provide the functionality of wireless transceiving for the LTE-based network 120 and the non-LTE network 130, respectively. For example, if the LTE-based network 120 is an LTE/LTE-Advanced network, the access network may be an Evolved-Universal Terrestrial Radio Access Network (E-UTRAN) and the core network may be an Evolved Packet Core (EPC) which includes a Home Subscriber Server (HSS), Mobility Management Entity (MME), Serving Gateway (S-GW), and Packet Data Network Gateway (PDN-GW or P-GW). If the non-LTE network 130 is a UMTS network, the access network may be a UTRAN and the core network may be a General Packet Radio Service (GPRS) core which includes a Home Location Register (HLR), at least one Serving GPRS Support Node (SGSN), and at least one Gateway GPRS Support Node (GGSN).

The mobile communication device 110 may be a smart phone, a panel Personal Computer (PC), a laptop computer, or any computing device supporting at least the LTE-based technology and the non-LTE technology utilized by the LTE-based network 120 and the non-LTE network 130, respectively. The mobile communication device 110 may selectively connect to one or both of the LTE-based network 120 and the non-LTE network 130 for obtaining wireless services.

Figure 2:
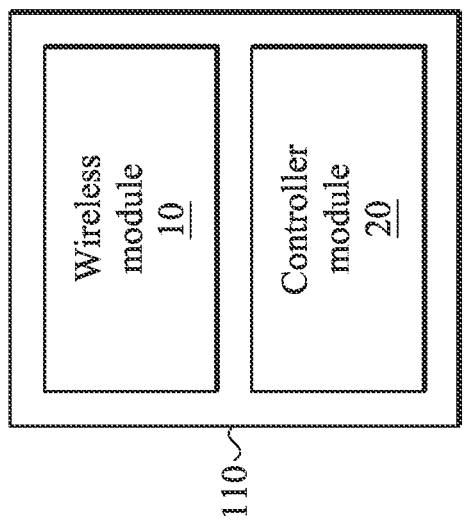
FIG. 2 is a block diagram illustrating the mobile communication device 110 according to an embodiment of the invention.

FIG. 2 is a block diagram illustrating the mobile communication device 110 according to an embodiment of the invention. The mobile communication device 110 comprises a wireless module 10 and a controller module 20. The wireless module 10 is responsible for performing the functionality of wireless transmissions and receptions to and from the LTE-based network 120 and the non-LTE network 130. The controller module 20 is responsible for controlling the operations of the wireless module 10, and other functional components (not shown), such as a display unit and/or keypad serving as the Man-Machine Interface (MMI), a storage unit storing the program codes of applications or communication protocols, or others. Also, the controller module 20 controls the wireless module 10 for performing the method for camping back to the LTE-based network 120 after finishing a CSFB call with the non-LTE network 130.

To further clarify, the wireless module 10 may be a Radio Frequency (RF) unit (not shown), and the controller module 20 may be a general-purpose processor or a Micro Control Unit (MCU) of a baseband unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communication system, wherein the radio frequency may be 900 MHz, 1900 MHz, or 2100 MHz utilized in the WCDMA technology, or 900 MHz, 2100 MHz, or 2.6 GHz utilized in LTE/LTE-Advanced technology, or others depending on the wireless technology in use.

Figure 3:
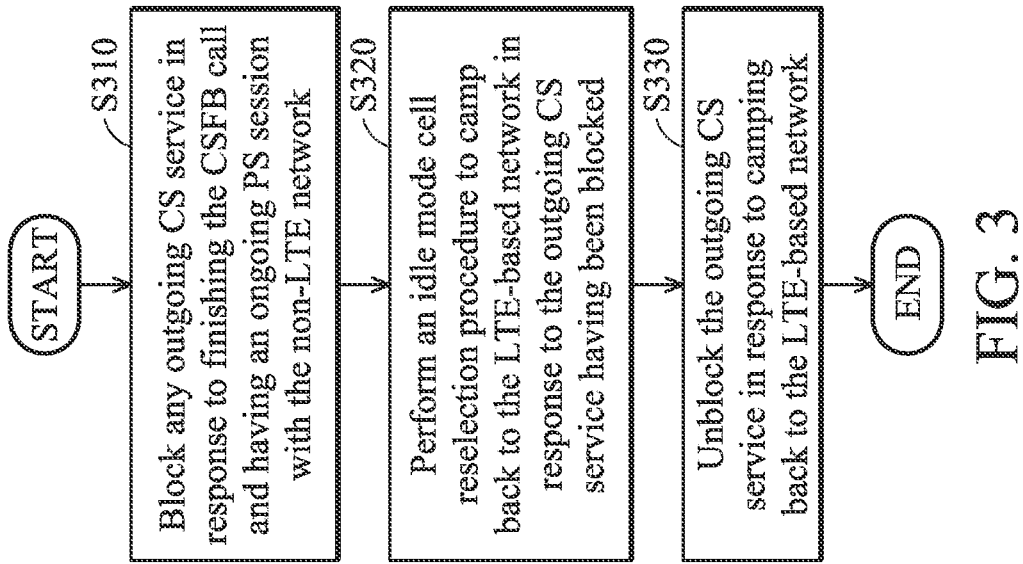
FIG. 3 is a flow chart illustrating the method for a mobile communication device to camp back to an LTE-based network after finishing a CSFB call with a non-LTE network according to an embodiment of the invention.

FIG. 3 is a flow chart illustrating the method for a mobile communication device to camp back to an LTE-based network after finishing a CSFB call with a non-LTE network according to an embodiment of the invention. In this embodiment, the mobile communication device is initially camped on the LTE-based network, and then switches to the non-LTE network for making a CSFB call. To begin, the mobile communication device blocks any outgoing CS service in response to finishing the CSFB call and having an ongoing PS session with the non-LTE network (step S310). Next, the mobile communication device performs an idle mode cell reselection procedure to camp back to the LTE-based network in response to the outgoing CS service having been blocked (step S320). After that, the mobile communication device unblocks the outgoing CS service in response to camping back to the LTE-based network (step S330), and the method ends.

Figure 4A:
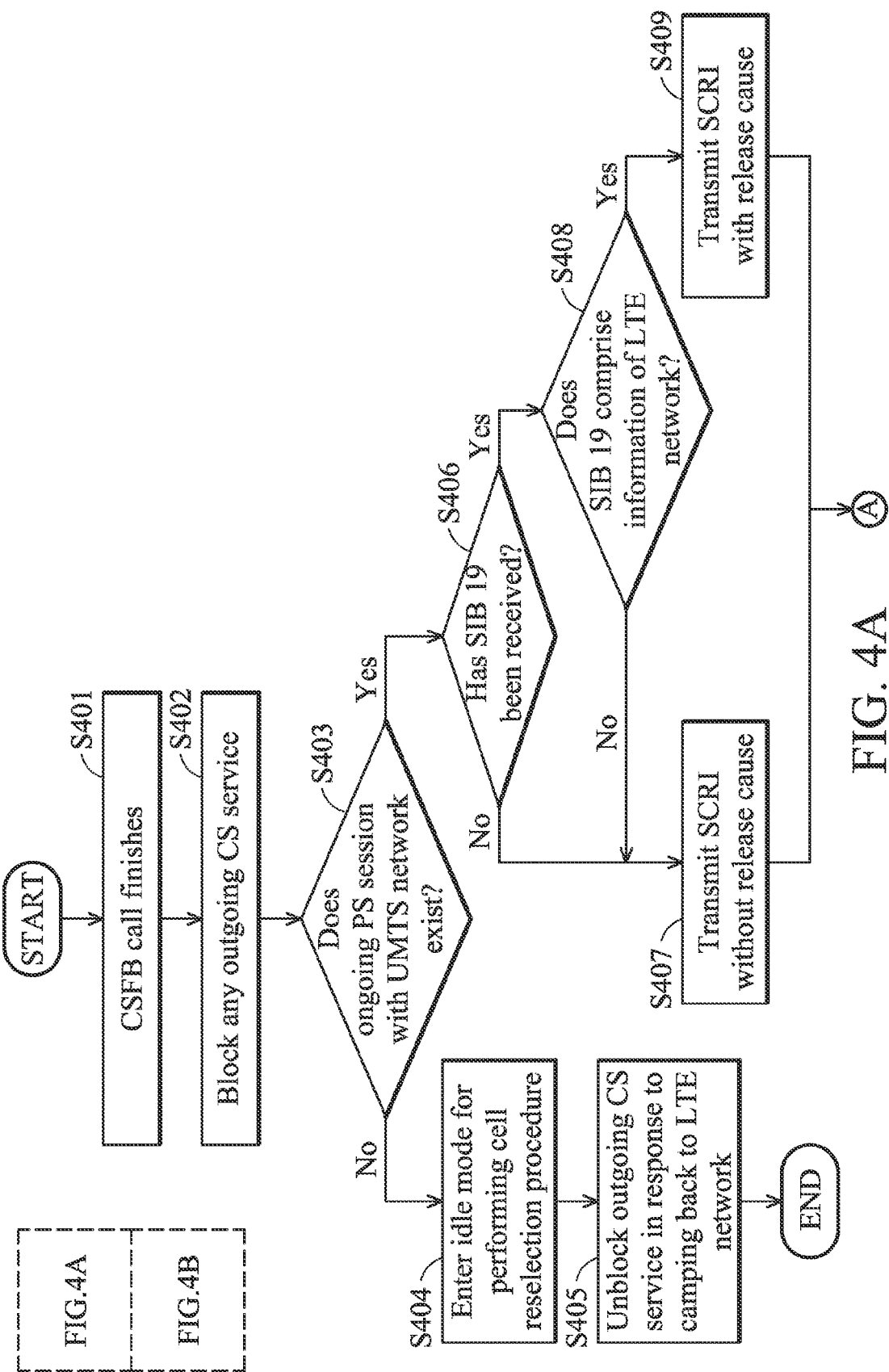
FIGS. 4A and 4B show a flow chart illustrating the method for a mobile communication device to camp back to an LTE network after finishing a CSFB call with a UMTS network according to an embodiment of the invention.
Figure 4B:
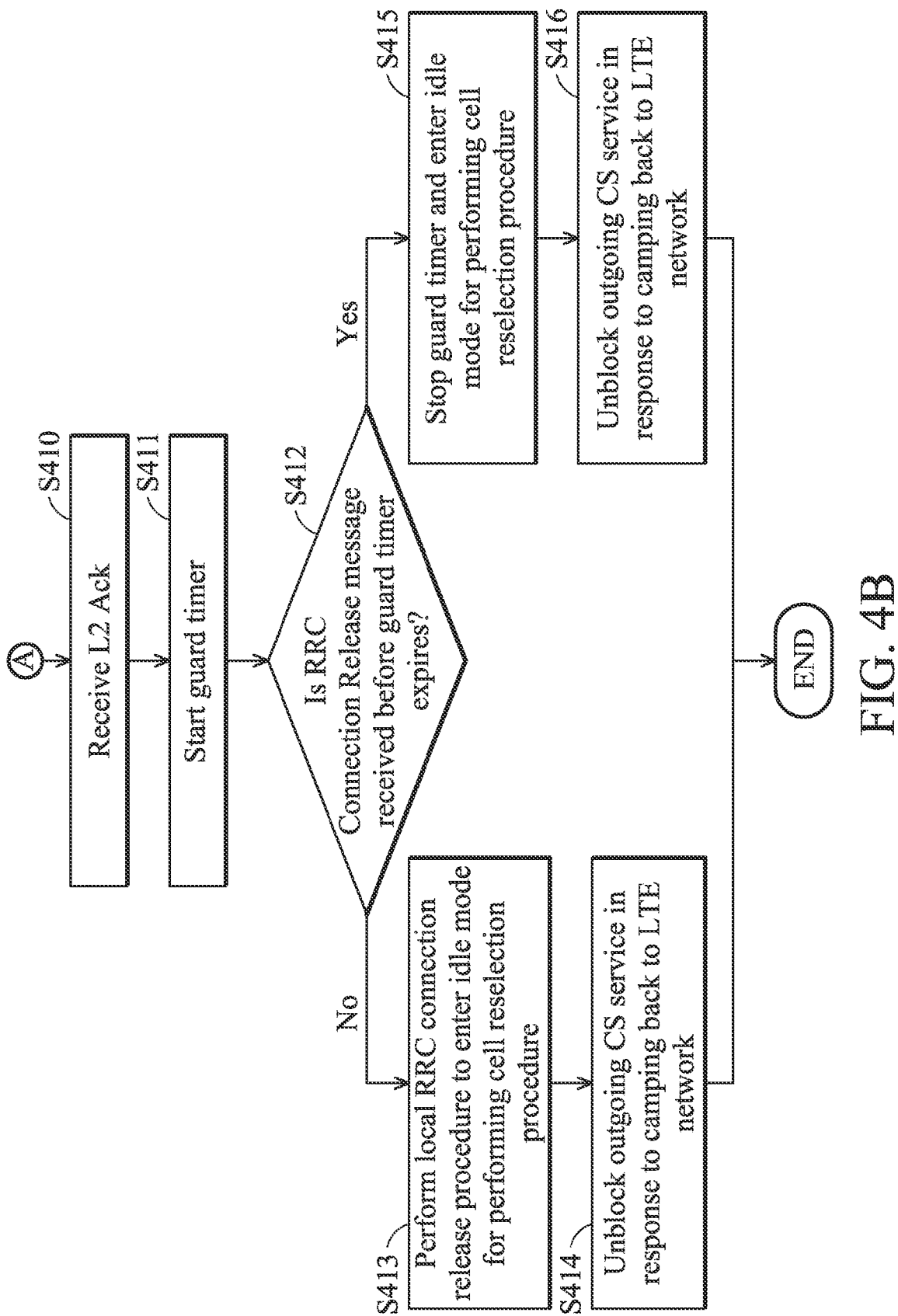

FIGS. 4A and 4B show a flow chart illustrating the method for a mobile communication device to camp back to an LTE network after finishing a CSFB call with a UMTS network according to an embodiment of the invention. Similarly, the mobile communication device is initially camped on the LTE network, and then switches to the UMTS network for making a CSFB call. To begin, the mobile communication device detects the finishing of the CSFB call (step S401), and then blocks any outgoing CS service in response to finishing the CSFB call (step S402). Next, it is determined whether an ongoing PS session with the UMTS network exists (step S403), and if not, the mobile communication device enters the idle mode for performing the idle mode cell reselection procedure (step S404) and unblocks the outgoing CS service in response to camping back to the LTE network (step S405).

Subsequent to the step S403, if an ongoing PS session with the UMTS network exists, the mobile communication device determines whether a System Information Block type 19 (SIB 19) has been received from the UMTS network (step S406), and if not, the mobile communication device transmits a Signaling Connection Release Indication (SCRI) without a release cause to the UMTS network (step S407). Otherwise, if an SIB 19 has been received, the mobile communication device determines whether the SIB 19 comprises information of the LTE network (step S408). Specifically, the information of the LTE network is contained in an "EUTRA information" Information Element (IE) of the SIB 19. If the SIB 19 does not comprise information of the LTE network, the method proceeds to the step S407 where an SCRI without a release cause is transmitted. Otherwise, if the SIB 19 comprises information of the LTE network, the mobile communication device transmits an SCRI with a release cause which is set to "UE Requested PS Data Session End" to the UMTS network (step S409).

After that, the mobile communication device receives a Layer 2 Acknowledgement (L2 Ack) corresponding to the SCRI from the UMTS network (step S410), and then starts a guard timer in response to receiving the L2 Ack (step S411). Specifically, the guard timer refers to the "NonEUTRA_Connection_Release" timer. Next, it is determined whether an RRC Connection Release message has been received from the UMTS network before the guard timer expires (step S412). If no RRC Connection Release message has been received from the UMTS network before the guard timer expires, the mobile communication device performs a local RRC connection release procedure to enter the idle mode for performing the idle mode cell reselection procedure (step S413) and then unblocks the outgoing CS service in response to camping back to the LTE network (step S414). Otherwise, if an RRC Connection Release message has been received from the UMTS network before the guard timer expires, the mobile communication device stops the guard timer and enters the idle mode for performing the idle mode cell reselection procedure (step S415), and then unblocks the outgoing CS service in response to camping back to the LTE network (step S416).

Note that, although the embodiment of FIGS. 4A and 4B is specific for the case where the CSFB call is made between an LTE network and a UMTS network, the present invention may also be applied to other cases where the CSFB call is made between another LTE-based network, such as an LTE-Advanced or TD-LTE network, and another 3G cellular network, such as a CDMA2000 1x, CDMA2000 1xEV-DO, or TD-SCDMA network, or another 2.5G cellular network, such as a GPRS or EDGE network, and the invention is not limited thereto.

In the present application, the idle mode cell reselection procedure may be a priority based cell reselection in compliance with sec. 5.2.6.1.4a of the 3GPP TS 25.304 specification, v10.2.0, or a non-priority based cell reselection in compliance with sec. 5.2.6.1.4 of the 3GPP TS 25.304 specification, v10.2.0, and the invention is not limited thereto. Detailed description of the idle mode cell reselection procedure is omitted herein as it is beyond the scope of the invention, and reference may be made to the 3GPP TS 25.304 specification, v10.2.0.

Note that, the present invention makes sure that the mobile communication device which has an ongoing PS session when finishing a CSFB call with the non-LTE network will spontaneously enter the idle mode and perform the idle mode cell reselection procedure, instead of staying in the connected mode to wait for a network message which is used to instruct a handover back to the LTE-based network but may not be deployed by the non-LTE network (e.g., RRC Connection Release message or a Handover from UTRAN message for the UMTS network). Advantageously, the idle mode cell reselection procedure gives the mobile communication device an opportunity to camp back to the LTE-based network as soon as possible.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A mobile communication device, comprising:
   a wireless module performing wireless transmissions and receptions to and From a Long Term Evolution (LTE)-based network and a non-LTE network; and
   a controller module blocking any outgoing Circuit-Switched (CS) service in response to finishing a CS Fallback (CSFB) call and having an ongoing Packet-Switched (PS) session with the non-LTE network, performing an idle mode cell reselection procedure via the wireless module to camp back to the LTE-based network in response to the outgoing CS service having been blocked, and unblocking the outgoing CS service in response to camping back to the LTE-based network.

2. The mobile communication device of claim 1, wherein the controller module further transmits a Signaling Connection Release Indication (SCRI) to the non-LTE network via the wireless module, prior to performing the idle mode cell reselection procedure.

3. The mobile communication device of claim 2, wherein the controller module further determines whether a System Information Block type 19 (SIB 19) has been received from the non-LTE network via the wireless module, prior to transmitting the SCRI, and the SCRI does not comprise a release cause in response to the SIB 19 not having been received from the non-LTE network.

4. The mobile communication device of claim 3, wherein the controller module further determines whether the SIB 19 comprises information of the LTE-based network in response to the SIB 19 having been received from the non-LTE network, and the SCRI does not comprise the release cause in response to the SIB 19 not comprising the information of the LTE-based network, and the SCRI comprises the release cause which is set to "UE Requested PS Data Session End" in response to the SIB 19 comprising the information of the LTE-based network.

5. The mobile communication device of claim 2, wherein the controller module further receives a Layer 2 Acknowledgement (L2 Ack) corresponding to the SCRI from the non-LTE network via the wireless module, and starts a guard timer in response to receiving the L2 Ack.

6. The mobile communication device of claim 5, wherein the controller module further determines whether a Radio Resource Control (RRC) Connection Release message has been received from the non-LTE network via the wireless Module before the guard timer expires, and stops the guard timer and enters an idle mode for performing the idle mode cell reselection procedure in response to receiving the RRC Connection Release message before the guard timer expires, and performs a local RRC connection release procedure to enter the idle mode for performing the idle mode cell reselection procedure in response to not receiving the RRC Connection Release message before the guard timer expires.

7. The mobile communication device of claim 1, wherein the LTE-based technology is an LTE technology, a TD-LTE technology, or an LTE-Advanced technology, and the non-LTE network is a Universal Mobile Telecommunications System (UMTS).

8. A method for a mobile communication device to camp back to a Long Term Evolution (LTE)-based network after finishing a Circuit-Switched Fallback (CSFB) call with a non-LTE network, comprising:
- blocking any outgoing CS service in response to finishing the CSFB call and having an ongoing Packet-Switched (PS) session with the non-LTE network;
- performing an idle mode cell reselection procedure to camp back to the LTE-based network in response to the outgoing CS service having been blocked; and
- unblocking the outgoing CS service in response to camping back to the LTE-based network.

9. The method of claim 8, further comprising:
- transmitting a Signaling Connection Release Indication (SCRI) to the non-LTE network, prior to performing the idle mode cell reselection procedure.

10. The method of claim 9, further comprising:
- determining whether a System Information Block type 19 (SIB 19) has been received from the non-LTE network, prior to transmitting the SCRI,
- wherein the SCRI does not comprise a release cause in response to the SIB 19 not having been received from the non-LTE network.

11. The method of claim 10, further comprising:
- determining whether the SIB 19 comprises information of the LTE-based Network in response to the SIB 19 having been received from the non-LTE network,
- wherein the SCRI does not comprise the release cause in response to the SIB 19 not comprising the information of the LTE-based network, and
- wherein the SCRI comprises the release cause which is set to "UE Requested PS Data Session End" in response to the SIB 19 comprising the information of the LTE-based network.

12. The method of claim 9, further comprising:
- receiving a Layer 2 Acknowledgement (L2 Ack) corresponding to the SCRI From the non-LTE network; and
- starting a guard timer in response to receiving the L2 Ack.

13. The method of claim 12, further comprising:
- determining whether a Radio Resource Control (RRC) Connection Release message has been received from the non-LTE network before the guard timer expires;
- stopping the guard timer and entering an idle mode for performing the idle Mode cell reselection procedure in response to receiving the RRC Connection Release message before the guard timer expires; and
- performing a local RRC connection release procedure to enter the idle mode For performing the idle mode cell reselection procedure in response to not receiving the RRC Connection Release message before the guard timer expires.

14. The method of claim 8, wherein the LTE-based technology is an LTE technology, a TD-LTE technology, or an LTE-Advanced technology, and the non-LTE network is a Universal Mobile Telecommunications System (UMTS).

* * * * *